(12) United States Patent
Young

(10) Patent No.: US 11,478,669 B1
(45) Date of Patent: Oct. 25, 2022

(54) AERIAL FIRE SUPPRESSION SYSTEM (71) Applicant: Larry Young, Los Angeles, CA (US)

(72) Inventor: Larry Young, Los Angeles, CA (US)

( * ) Notice: Subject to any disclaimer, the term of this patent is extended or adjusted under 35 U.S.C. 154(b) by 0 days.

(21) Appl. No.: 17/529,639

(22) Filed: Nov. 18, 2021

(51) Int. Cl.
A62C 3/02 (2006.01)
B64D 1/16 (2006.01)

(52) U.S. Cl.
CPC .............. *A62C 3/0242* (2013.01); *B64D 1/16* (2013.01)

(58) Field of Classification Search
CPC ...... A62C 3/0228; A62C 3/0242; B64D 1/16; B64D 1/18; B05B 15/68; B05B 15/628; B05B 13/005
USPC ..................................... 169/53; 239/159–171
See application file for complete search history.

(56) References Cited

U.S. PATENT DOCUMENTS

| 3,604,627 | A | * | 9/1971 | Miscovich | .............. | A62C 31/24 239/166 |
| 4,979,571 | A | * | 12/1990 | MacDonald | ......... | A62C 3/0242 169/14 |
| 5,239,615 | A | * | 8/1993 | Moore | ...................... | B67D 7/80 126/343.5 A |
| 9,278,237 | B2 | | 3/2016 | Cook | | |
| 9,981,150 | B2 | | 5/2018 | Zimmerman | | |
| 2002/0125016 | A1 | | 9/2002 | Cofield | | |
| 2016/0236023 | A1 | | 8/2016 | Zimmerman | | |
| 2018/0215597 | A1 | * | 8/2018 | Linsmeier | ................ | E06C 7/16 |
| 2019/0134440 | A1 | * | 5/2019 | Carter | ..................... | F04B 17/06 |
| 2019/0388926 | A1 | * | 12/2019 | Raman | ................ | B05B 13/0431 |
| 2021/0206134 | A1 | * | 7/2021 | Ryder | ..................... | B32B 27/12 |

FOREIGN PATENT DOCUMENTS

GB 2133688 A * 8/1984 ............... B64D 1/16

* cited by examiner

*Primary Examiner* — Cody J Lieuwen
(74) *Attorney, Agent, or Firm* — Daniel M. Cohn; Howard M. Cohn (57) ABSTRACT

The embodiment of an aerial fire suppression system comprising of a water tank (104) clamped to a transport unit (100), and a snorkel (108) connected to the water tank (104) for pumping water. A straight boom lift (200) is mounted to the transport unit (100). The straight boom lift (200) has a tower boom (206) that can pivot downward from the transport unit (100). The tower boom (206) has extension booms (208, 210, 212, 214) attached to it that can extend to and fro. The inner most extension boom (214) has a main boom (218) mounted to it. The main boom (218) can pivot about the extension boom (214). Each end of the main boom (218) has a water cannon (230) mounted on it. The water cannon (230) consists of a monitor (232) that rotates about and a pivotal fire nozzle (234). The water cannons have the capacity to blast water or a product on a natural disaster. The technique enables the main boom (218) and water cannons (230) to maneuver and pivot within close proximity of a fire.

14 Claims, 4 Drawing Sheets

View A
Fig. 3

AERIAL FIRE SUPPRESSION SYSTEM

BACKGROUND

Wildfires and forest fires have been raging through the western regions of the United States, especially in California during the fire seasons. Added to the fact that climate change has impacted the country and the world leading to severe drought years in some regions. These drought years lead to dry vegetation. This dry vegetation is a major fuel source for wildfires. In many cases firefighting systems cannot reach the area where the wildfires are burning due to the topography. This causes the wildfire to burn out of control, sometimes taking days or weeks before the firefighting systems can contain the fire and get control of it, while destroying thousands of acres of land in many cases.

When wildland fires are burning and cannot be reached on land, the practice of suppressing the fire is done with firefighting aircraft: using helicopters and airplanes to drop water, foam, or a fire retardant. An S-64F aircrane helitanker is a helicopter that is one of the aircrafts used for firefighting practices. Basically, the helicopter has a pump attached to a hose that fills a tank with water from a reservoir. The helicopter flies to the disaster area and drops the water or fire retardant on the fire. However, the effectiveness of this practice is minimal since the water is suddenly dropped all at once, at a high altitude, and only on a concentrated area. A large percentage of this water misses the essential area of the blaze it is trying to suppress.

Airborne firefighting devices equipment with a boom and water canon were tried in the past. The boom was located toward the front of the aerial firefighting unit. The boom looked like a missile launcher that shot the water straight out from the front of the unit with a cannon. These devices were ineffective and failed. These systems were replaced by S-64F aircrane helitanker and aerial extinguishers.

The practice of airborne firefighting systems dropping water on a fire at a high altitude has become standard operation for combating a wildfire with aerial firefighting operation. This technique is very ineffective as we all have witnessed through the media. However, and to date, this has been the only resource.

It is also common for fire extinguishing material to be dispersed from airplanes or helicopters onto forest fires, or other types of conflagrations, particularly where fire fighters cannot reach the site on the ground. In some instances, the material is sprayed onto the fire from the plane and, in other cases, bombs or other projectiles filled with fire quenching compounds are dropped directly into the fire, the device distributing its contents upon impact with the ground.

Some of the problems with the prior art aerial extinguishers include the fact that they are very complicated and bulky and do not ensure that the fire extinguishing material can be adequately dispersed. That is particularly true of the type of aerial bomb that is to release its contents above the fire when the downward flight of the bomb is retarded.

The first fire engine was invented over 300 years ago. A system was developed to combat fires with ground units. This old system has had major improvements throughout the years, but basically it is the same technique for fighting a fire. The basic system for combating a fire is: a ground unit with fire equipment and fire fighters; and an airborne firefighting unit with aircraft and helicopters dropping water or fire retardants on the fire. A better technique is needed and demands for a new system needs to be developed.

New technology is being developed to pinpoint when and where a fire breaks out in rural areas. It is a theory that many wildfires can be contained if they were reached early enough. However, these fires quickly burn out of control due to dry vegetation, which is a fuel source, and sometimes, windy conditions.

A vital emphasis for a new fire suppression system to work, would be to effectively contain and suppress these fires as soon as they start. Therefore, it would be highly desirable to develop a system and a technique for suppressing these fires before they get out of control. Hence, a complete system and technique that can reach and suppress these types of fires are desirable to meet the challenges of minimizing the adverse impacts on the environment.

SUMMARY

In an example embodiment, an aerial fire suppression system may be used to combat a fire by: a transport unit positioning and hovering near the fire; a straight boom lift mounted to the transport unit; the straight boom lift can pivot towards the target area; the straight boom lift has a tower boom mounted on it; the tower boom can rotate downward; the tower boom has extension booms attached to it; the extension booms can lower and extend toward the proximity of the fire; a main boom is mounted on the end of the extension boom, the main boom makes a pivot toward the direction of the fire; water cannons mounted on the end of the main boom; the water cannons comprise of a monitor and a fire nozzle; the monitor rotates toward the flames; the fire nozzle is directed at the flames where the water cannons blasts water on the fire.

| Drawings-Numerals | | | |
|---|---|---|---|
| 100 | transport unit | 200 | straight boom lift |
| 102 | cargo area | 202 | shaft |
| 104 | water tank | 204 | turntable |
| 106 | clamp | 206 | tower boom |
| 108 | snorkel | 208 | extension boom |
| 110 | console | 210 | extension boom |
| 112 | frame | 212 | extension boom |
| 114 | controls | 214 | extension boom |
| 116 | dis-connect unit | 216 | upright |
| 118 | plate | 218 | main boom |
| 120 | plate | 220 | mount |
| 122 | plate support | 222 | main lift cylinder |
| 124 | union bracket | 224 | mounting block |

-continued

| Drawings-Numerals | | | |
|---|---|---|---|
| 126 | union bracket | 226 | intake base |
| 228 | shoulder | | |
| 230 | water cannon | | |
| 232 | monitor | | |
| 234 | fire nozzle | | |
| 236 | union bracket | | |

| Drawings-Numerals 300 | | | |
|---|---|---|---|
| 300 | pipe elbow | 320 | hose |
| 302 | pipe flange | 322 | hose liner |
| 304 | water pump | 324 | hose |
| 306 | solenoid valve | 326 | hose plug |
| 308 | 45° elbow | 328 | union |
| 310 | nipple | 330 | hose |
| 312 | wye | 332 | hose coupling elbow |
| 314 | connector-swivel | 334 | hose |
| 316 | elbow | 336 | hose coupling |
| 318 | hose fitting | 338 | pipe nipple |

DETAILED DESCRIPTION—THE EMBODIMENT

In the description that follows, numerous details are set forth in order to provide a thorough understanding of the embodiment. It will be appreciated by those skilled in the art that variations of these specific details are possible while still achieving the results of this embodiment. Well-known processing steps are generally not described in detail in order to avoid unnecessarily obfuscating the description of the embodiment.

In the description that follows, exemplary dimensions may be presented for an illustration of the embodiment. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

At present, various firefighting devices and apparatus are known in the state of the art. More specifically, the use of aerial means and aircraft is currently recognized as an effective resource for extinguishing forest fires. Forest fires have caused serious consequences in the United States in recent years, both to people and their properties, and the environment. The environmental, and financial consequences of these forest fires have been extremely detrimental.

The embodiment resolves the aforementioned drawbacks providing an air-transported fire extinguishing device, which makes it possible to substantially increase the efficiency and performance of the aerial means when extinguishing fires, whether forest, industrial or urban fires, and whereby it is possible to reduce both the time used in putting out the fire, and the economic costs arising from the entire extinguishing process, from when the voice of alarm is received until the fire has been totally controlled.

The current embodiment seeks to provide suppression techniques to be used in firefighting to control the movement of wildland fires, forest fires, or urban fires.

In one embodiment, a transport unit 100 will be modified for a firefighting unit. In this example, Sikorsky S-64 helicopter is converted to the firefighting unit, similar to the S-64F aircrane helitanker, FIG. 9. A drone or other types of aircraft can be converted for a firefighting unit. A water tank 104 is clamped to the transport unit 100 with (8) clamps 106. The water tank 104 is equipped with a snorkel 108 for pumping water from a reservoir to the tank. The snorkel 108 is the same snorkel used on the S-64F aircrane, FIG. 2. The cargo area 102 inside the cabin will be elongated. Inside of the cargo area 102, a hole is cut-out on the center of the floor of the transport unit 100.

Figure 2:
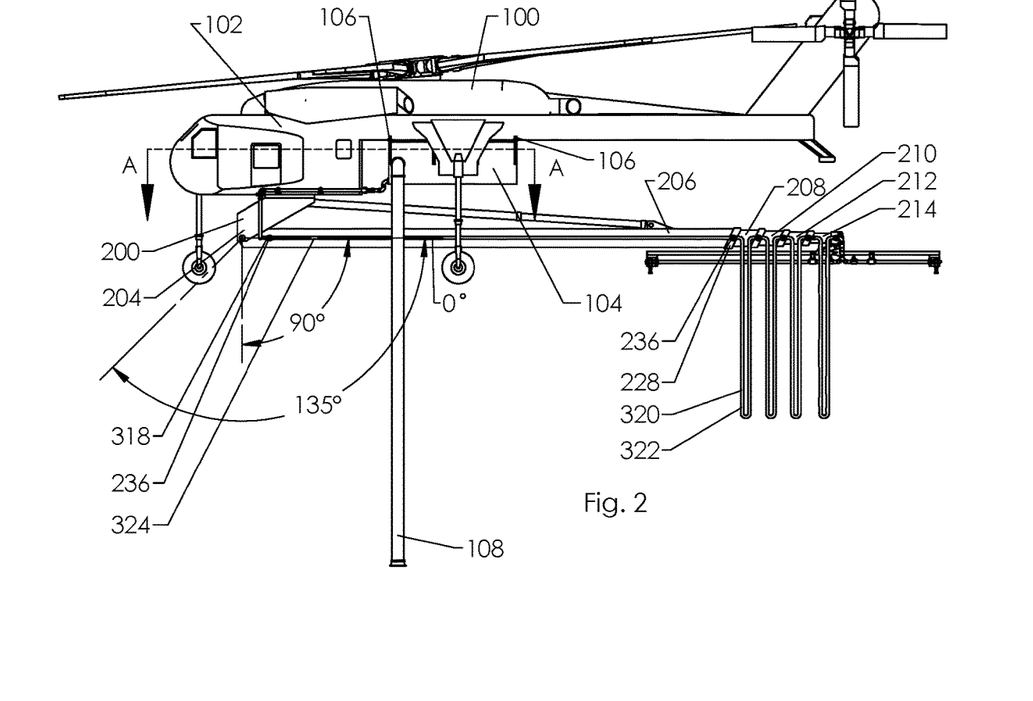
FIG. 2 is a Side, Elevation View of the aerial fire suppression apparatus in a closed position.
Figure 3:
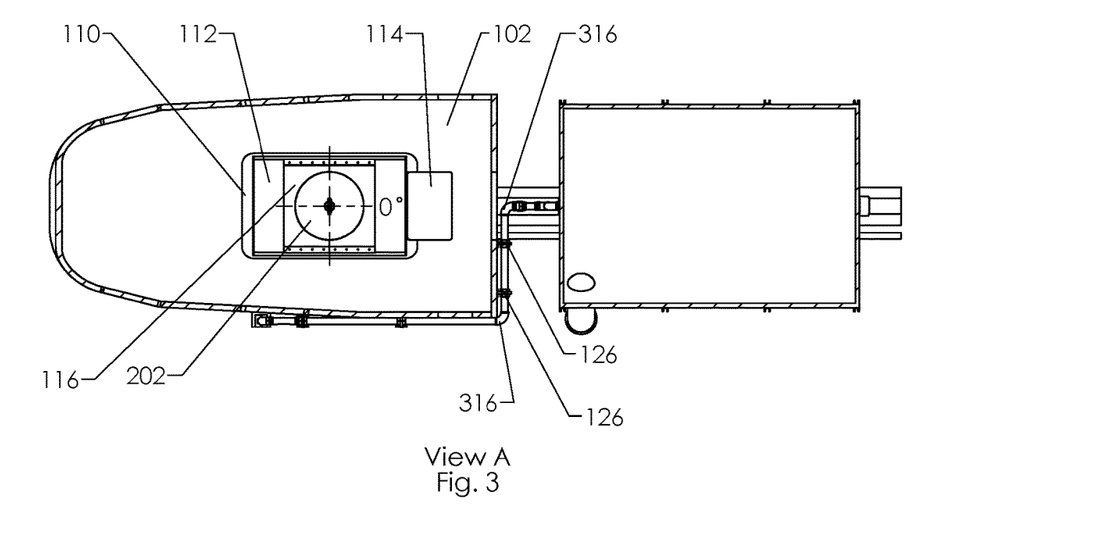
FIG. 3 is Section View A-A of FIG. 2 of the aerial fire suppression apparatus.

A special made straight boom lift 200 will be used in a reverse direction application, FIG. 2. The console 110 of the straight boom lift 200, with its frame 112 and controls 114 are centered on the floor, inside the cargo area 102, over the hole cut-out, FIG. 3. A shaft 202 that supports the turntable 204 of the straight boom lift 200 is positioned from the bottom, outside area of the transport unit 100. The turntable 204 will be facing downward from the bottom area of the transport unit 100, FIG. 5. The tower boom 206 of the straight boom lift 200, in a closed position, is parallel to the center of the transport unit 100 running from the front center area toward the rear of the transport unit 100, FIG. 2. The shaft 202 is then inserted through the cut-out area in the cargo area 102 of the transport unit 100 and into the console 110 of the straight boom lift 200 that is inside of the cargo area 102, FIG. 5. The shaft 202 is positioned on the frame 112 inside of the console 110, FIG. 3. The shaft 202 can rotate from 0° to 360°: shaft 202 can rotate in a clockwise or counter clockwise direction. A quick dis-connect unit 116 is positioned over the console 110 to secure the shaft 202 to the frame 112 of the straight boom lift 200, FIG. 3.

In this example, the tower boom 206 will be equipped with extension booms 208, 210, 212, and 214 that are made to fit inside one another. The tower boom 206 and extension booms 208, 210, 212, and 214 each have a shoulder 228 on the outer, exposed area on each member, FIG. 2. The shaft 202 is connected to the turntable 204. The tower boom 206 is connected to the turntable 204. The tower boom 206 that is parallel and connected to the turntable 204 can turn or rotated downward. When the tower boom 206 is closed and parallel with the transport unit 100, it is at 0°. When the tower boom 206 is rotated downward and vertical with the bottom of the transport unit 100, it is at 90°. The tower boom 206 can rotate from 0° to 135°. This is rotating an additional 45° with the 90°, vertical angle, FIG. 2.

Figure 4:
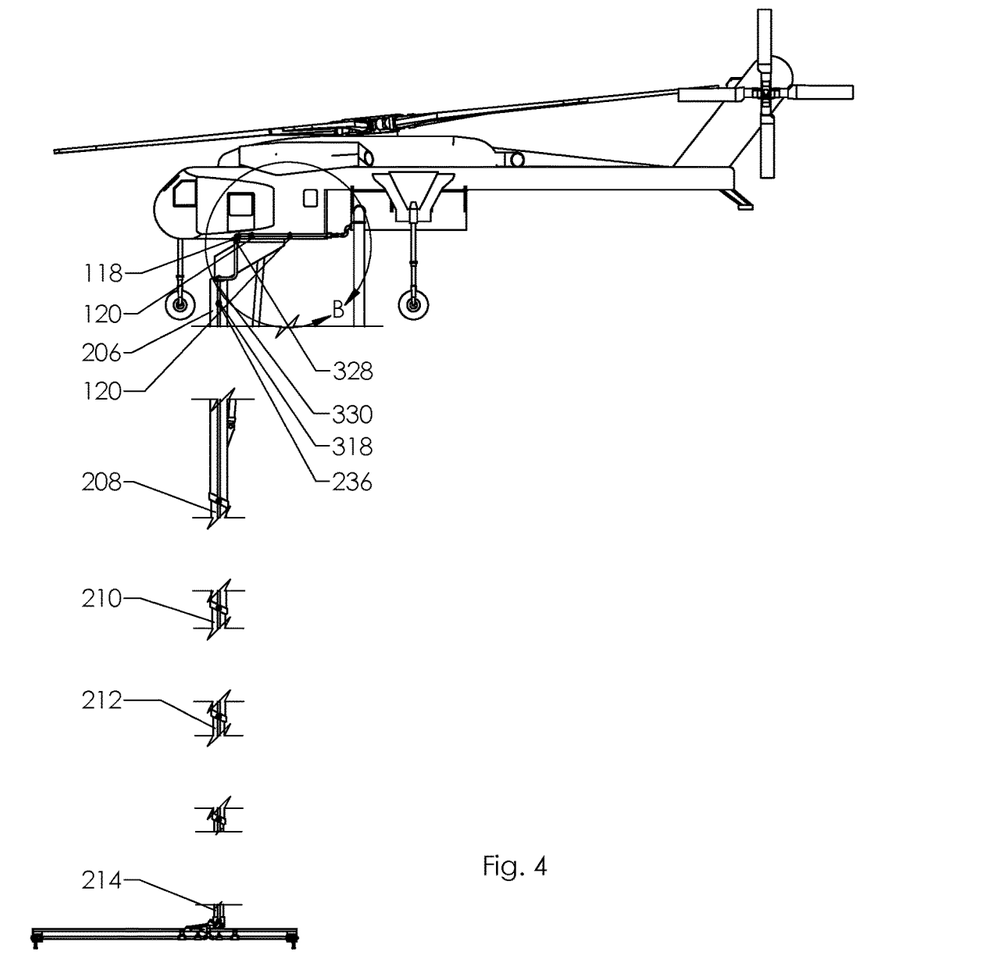
FIG. 4 is a Side, Elevation View of the aerial fire suppression apparatus in an operating position with broken-out sections.

The tower boom 206 is 16 m long in this example. Each extension booms 208, 210, 212, and 214 are 12.5 m long. Therefore, the tower boom 206 with its (4) extension booms 208, 210, 212, and 214 can extend out from any range of 18 m to 64 m, FIG. 4. The extension boom 214 is the inner most extension boom that extends the furthest from the tower boom 206. The extension boom 214 has an upright 216 attached to it. When the upright 216 is perpendicular with the extension boom 214 that it is attached to: it is at 0°: the upright 216 can pivot from 0° to 90° on one side and 0° to 80° on the opposite side, FIG. 6.

A main boom 218 is attached to the upright 216. In this example, the main boom 218 is 10 cm×30 cm rectangular steel tubing. The main boom 218 is 9 m long. The main boom 218 has a mount 220 attached to it. One end of a main lift cylinder 222 is fitted to the upright 216 and the other end of the main lift cylinder 222 is fitted to the mount 220 on the main boom 218. The main boom 218 is 9 m long. One end of the main boom 218 will be 3 m from the center of the extension boom 214, FIG. 6.

Figure 7:
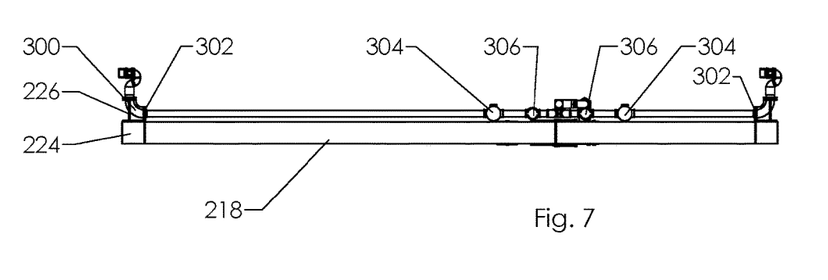
FIG. 7 is a Bottom View of a main boom 218 mounted on an extension boom 214.

A mounting block 224 is fitted on each end of the main boom 218. An intake base 226 are attached to each mounting block 224. The intake base 226 is a bracket with a pipe elbow 300 welded to it; the pipe elbow 300 is a 90° elbow with 3"npt piping, FIG. 7.

Figure 6:
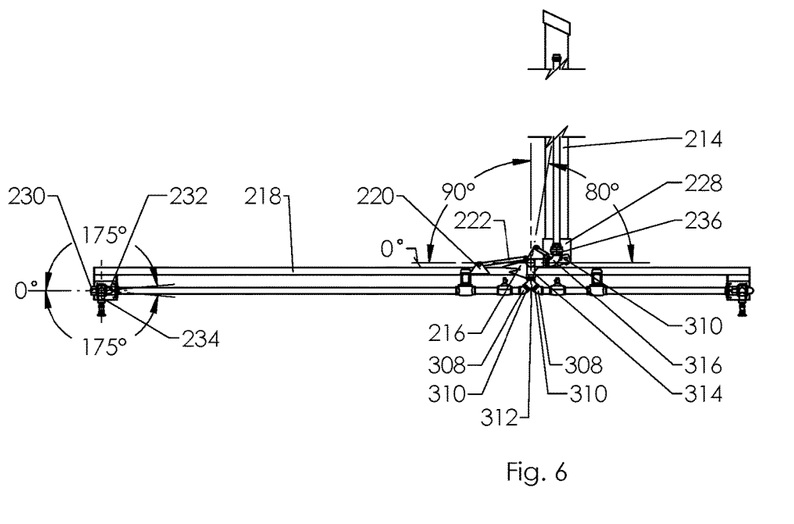
FIG. 6 is a Side, Elevation View of a main boom 218 mounted on an extension boom 214.
Figure 8:
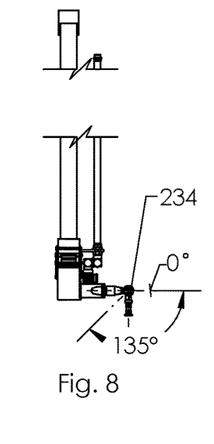
FIG. 8 is a Front, Elevation View of a main boom 218 mounted on an extension boom 214.

A water cannon 230 is fitted over each intake base 226, FIG. 6. The water cannon 230 consists of a monitor 232 and a fire nozzle 234 that is attached to the monitor 232. The monitor 232 on the water cannon 230 is fitted over the pipe elbow 300 of the intake base 226. When the fire nozzle 234 of the water cannon 230 is parallel and facing outward: it is at a 0° position: the monitor 232 can pivot from 0° to 175° on one rotation and pivot from 0° to 175° in the opposite rotation, FIG. 6. Whatever position the monitor 232 pivot or rotates to, the fire nozzle 234 is always perpendicular to the monitor 232. When the fire nozzle 234 of the water cannon 230 is parallel and facing outward, the fire nozzle 234 is kept perpendicular to the body of the monitor 232: the fire nozzle 234 can rotate from 0° to 135°, while staying perpendicular with the body of the monitor 232, FIG. 8.

Piping with fittings and hoses are ran from the water cannon 230 to the water tank 104. The piping, pipe fittings, and hoses will all be sized at 3" npt piping in this example. A pipe flange 302 is fitted over the open end of the pipe elbow 300 on the intake base 226. A water pump 304 is positioned away from, concentric, and in-line with the pipe flange 302. A solenoid valve 306 is positioned concentric, in-line and away from the water pump 304, FIG. 7. A 45° elbow 308 is positioned away from and in-line with the solenoid valve 306. A nipple 310 is connected on the other end of the 45° elbow 308. A wye 312 is connected to the other end of the nipple 310, FIG. 6. Piping is fitted and connected: from the pipe flange 302 to the water pump 304: from the water pump 304 to the solenoid valve 306: from the solenoid valve 306 to the 45° elbow 308. The wye 312 is positioned near the extension boom 214. This is on one side of the main boom 218, FIG. 6.

The same connections are made on the other side of the main boom 218: The $2^{nd}$ pipe flange 302 is fitted over the open end of the pipe elbow 300 on the intake base 226. The $2^{nd}$ water pump 304 is positioned away from, concentric, and in-line with the pipe flange 302. The $2^{nd}$ solenoid valve 306 is positioned away from and in-line with the $2^{nd}$ water pump 304, FIG. 7. The $2^{nd}$ 45° elbow is 308 positioned away from and in-line with the $2^{nd}$ solenoid valve 306. The $2^{nd}$ nipple 310 is connected to the $2^{nd}$ 45° elbow 308. The $2^{nd}$ nipple 310 is connected to the other end of the wye 312, FIG. 6. Piping is fitted and connected: from the pipe flange 302 to the water pump 304: from the water pump 304 to the solenoid valve 306: from the solenoid valve 306 to the 45° elbow 308: a nipple 310 is connected on the other end of the 45° elbow 308: the wye 312 is connected to the other end of the nipple 310, FIG. 6.

The wye 312 is fitted to a connector-swivel 314. The connector-swivel 314 rotates with the same rotation on the main boom 218 and maintains a parallel position to the main boom's 218 rotation. An elbow 316 is connected to the connector-swivel 314. The other end of the elbow 316 is connected to the $3^{rd}$ nipple 310. The nipple 310 is connected to a union bracket 236. The union bracket 236 is mounted to the shoulder 228 on extension boom 214, FIG. 6. Altogether, there will be 5 union brackets 236 mounted on the shoulders 228 of the extension booms 208, 210, 212, and 214 and on the shoulder 228 of the tower boom 206, FIG. 2. A $6^{th}$ union bracket 236 will be mounted to the lower end of the tower boom 206. A hose fitting 318 is connected to the $6^{th}$ union bracket 236, FIG. 2. (4) hoses 320 are covered with (4) hose liners 322. The hose liners 322 can withstand temperatures greater than 538° Celsius. (3) hoses 320 will connect to the (3) union brackets on the extension booms 210, 212, and 214. The $4^{th}$ hose 320 will connect to the union bracket 236 on the shoulder 228 of extension boom 208 to the union bracket 236 on the shoulder 228 of the tower boom 206, FIG. 2. A hose 324 will connect from union bracket 236 on the shoulder of the tower boom 206 to the union bracket 236 on the other end of the tower boom 206, FIG. 2.

A plate 118 and (2) plates 120 are mounted to the bottom, side, and outer area of the transport unit 100. The plate 118 is located near the front of the turntable 204: the plate 120 is located toward the rear of the plate 118: the $2^{nd}$ plate 120 is located from the middle of the cargo area, FIG. 4. The plate 118 has hole cut-out near its center. A plate support 122 is positioned over the hole cut-out in plate 118. A hose plug 326 is fitted over the plate support 122. A union 328 connects to the bottom side of the hose plug 326, FIG. 5. Hose 330 is ran from the union 328 to the hose fitting 318. The hose fitting 318 is connected to union bracket 236 on the lower end of the tower boom 206, FIG. 4.

Figure 5:
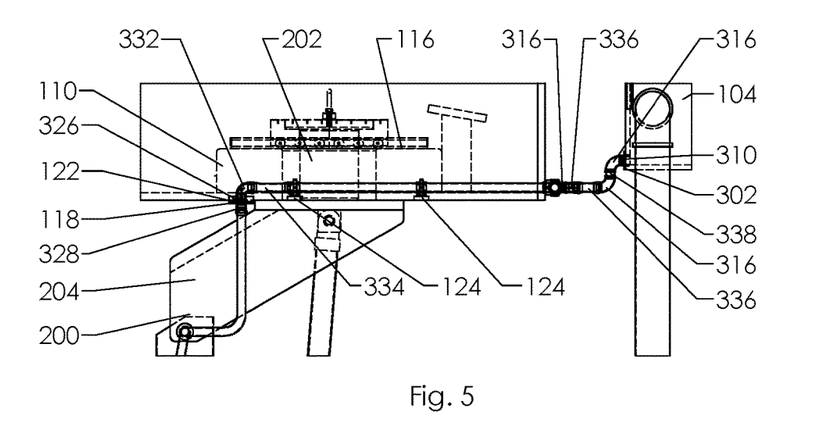
FIG. 5 is Detailed View B of FIG. 4 of the aerial fire suppression apparatus in an operating position.

A hose coupling elbow 332 is connected to the hose plug 326, FIG. 5. The hose coupling elbow 332 is a quick dis-connect. (2) Union brackets 124 are mounted to the (2) plates 120. Hose 334 is ran from the hose coupling elbow 332 to the union bracket 124 on plate 120, FIG. 5. An elbow 316 is concentric an in-line with the union brackets 124 position at the outer rear, corner area of the cargo area 102 of the transport unit 100, FIG. 5. 2 union brackets 126 are mounted on the rear of the cargo area, at the bottom. The union brackets 126 are concentric with the elbow 316: 1 union bracket 126 is aligned with the elbow 316, at the rear of the cargo area 102: the other union bracket 126 is close to the rear, side of the cargo area 102, FIG. 3. A $2^{nd}$ elbow 316 is concentric and in-line with the union brackets 126. The $2^{nd}$ elbow 316 is near the center, at the rear of the cargo area 102. Piping is fitted and ran from the pipe fittings: from the two union brackets 126: from the last union bracket 126 to the elbow 316: from the other end of the elbow 316 to union bracket 124: from union bracket 124 to union bracket 124: from the last union bracket 124 to the elbow 316, FIG. 3.

A hose coupling 336 is connected to the elbow 316. The hose coupling 336 is a quick dis-connect coupling, FIG. 5. A flange 302 is fitted over the front, lower, and centered over the front end of the water tank 104. A nipple 310 is connected to the flange 302. An elbow 316 is connected to the nipple 310. A pipe nipple 338 is connected to the elbow 316. A hose 336 is connected from the elbow 316 to the hose coupling 336, FIG. 5.

Operation

The systems will be described in detail with regard for the example embodiment. The embodiment is a systems and technique for fire suppression. In general, when a fire breaks out, the key elements of the fire is a fuel source and oxygen. The system and technique are to rapidly suppress the fire before it burns out of control. And, if the fire is already out of control, the systems is to contain it as soon as possible. When the fire cannot be reached by ground units, an aerial fire suppression system can be deployed. The aerial fire suppression systems can reach regions where the topography prevents ground firefighting units from reaching the fire and airborne firefighting units are at a disadvantage because they have to fly at a high altitude, disabling them from getting within close proximity to battle the fires.

In one embodiment, a transport unit 100 will be modified for a firefighting unit. In this example, Sikorsky S-64 helicopter is converted to the firefighting unit, similar to the S-64F aircrane helitanker, FIG. 9. A water tank 104 is clamped to the transport unit with (8) clamps 106. The water tank 104 is equipped with a snorkel 108 for pumping water from a reservoir to the tank. The snorkel 108 is the same snorkel used on the S-64F aircrane, FIG. 2. The water tank 104 has the capacity to hold 9,464 liters of water in this example. Different size water tanks can be used. The water tank 104 is fitted with a 36 cm diameter, 12 m long flexible snorkel that enables the unit to hover-fill from a variety of water sources. It can self-fill 9,464L of water in about 40 seconds.

Figures 1, 9:
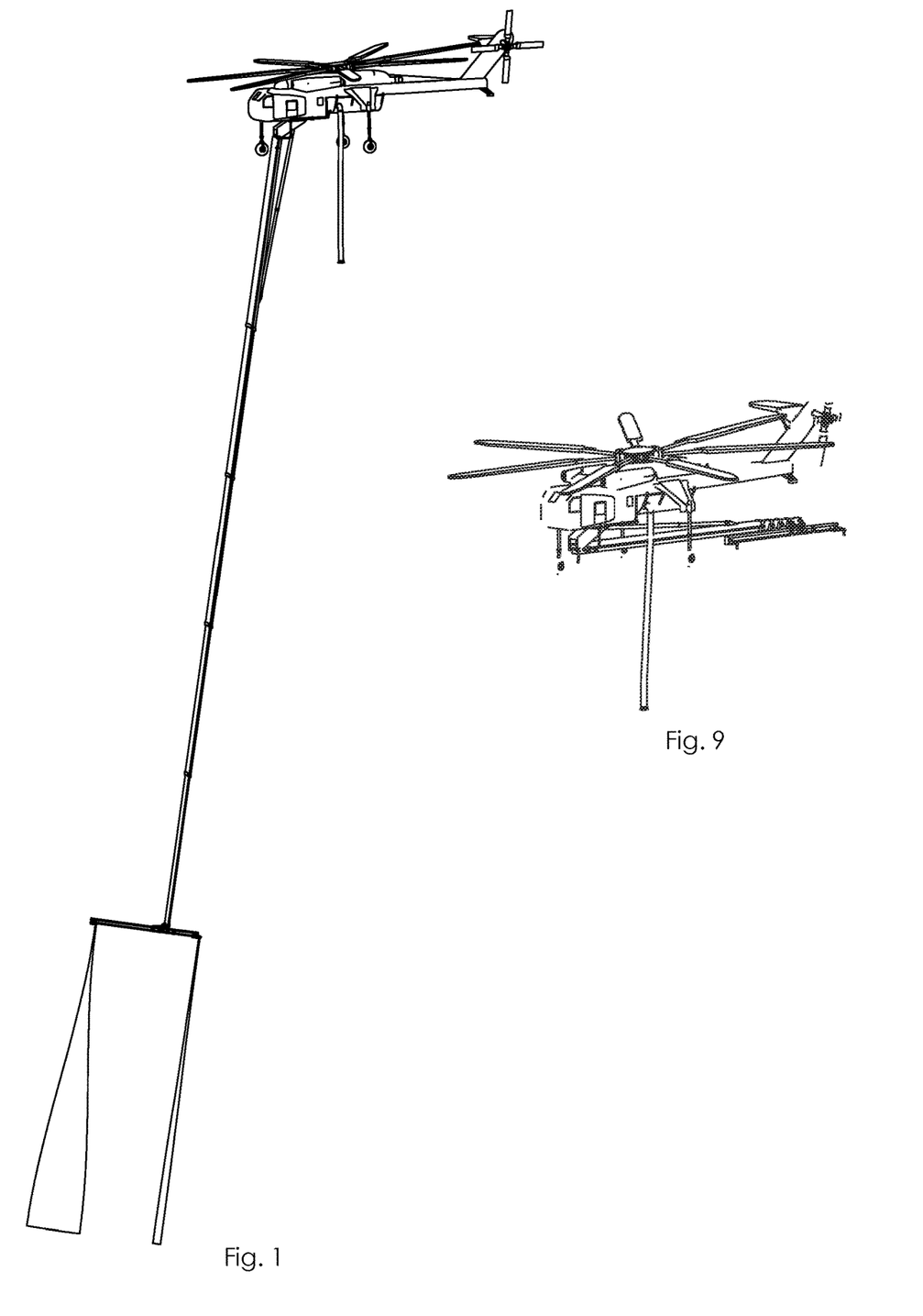
FIG. 1 is a Perspective View of an aerial fire suppression apparatus in an operating position.
FIG. 9 is a Perspective View of the aerial fire suppression apparatus in a closed position.

As an illustration, a fire is burning and the aerial fire suppression system is deployed. The transport unit 100 will go to the reservoir nearest the disaster area and pump water from the snorkel 108 to the water tank 104. FIG. 9 shows the transport unit 100 in a closed position when traveling or when its filling water to water tank 104 from a reservoir.

The transport unit 100 proceeds to the fire. The transport unit 100 can travel at a high rate of speed: it can cruise at speeds greater than 160 km/hr. When the transport unit 100 reaches its destination, the transport unit 100 can hover and positioned itself over or near the target area. The transport unit 100 elevation height has to be above the smoke rising from the fire and a safe distance from the heat and flames from the smoke and the fire. The transport unit 100 will positioned itself near the target area of the fire. FIG. 1 is an example showing transport unit 100 in an operating position when it is combating a fire.

One strategy for combating a fire with a straight boom lift 200 would be to positioned the front of the turntable 204 toward the target area of the fire. In this example, the turntable 204 is at 270°. The turntable 204 can rotate from 0 to 360° in a clockwise or counter-clockwise direction, FIG. 3. Many different types of boom lifts can be used: electric boom lift, telescopic boom lift, an articulating boom lift, or even other types.

When the turntable 204 is positioned at 270°, clockwise rotation, the tower boom 206 is rotated downward to 100° in this example, FIG. 1. The tower boom 206 can rotate from 0 to 135°, FIG. 2. The straight boom 200 lift can maneuver to a range of motions: it can revolve, extend back and forth, rotate, and pivot in various directions. The tower boom 206 is opened to its maximum length. The tower boom 206 with its (4) extension booms 208, 210, 212, and 214 can extend out from any range of 18 m to 64 m in this example, FIG. 4. Each of these members can be made to different lengths.

The extension boom 214 is the inner most extension boom that extends the furthest from the tower boom 206. The main boom 218 is connected to the extension boom 214. In this example, the main boom 218 is kept perpendicular, or 0° with extension boom 214. The main boom 218 is attached to the upright 216. When the upright 216 is perpendicular with the extension boom 214 that it is attached to: it is at 0°, or perpendicular with extension boom 214; the upright 216 can pivot from 0° to 90° on one side and 0° to 80° on the opposite side, FIG. 6.

The main boom 218 has a water cannon 230 mounted on each end of the main boom 218, FIG. 6. These dual water cannons can work: simultaneously together: or alternate: or one at a time. The water cannon 230 can be pinpointed at the target area of a fire. Or, both water cannons can be pinpointed at the target area of a fire: aimed at opposite sides of a fire: or pinpointed at multiple directions of different fires. In this example, a dual water cannons 230 are illustrated. There are many different combinations that can be accomplished. The main boom 218 can have multiple water cannons 230 mounted on it. Or, in woody regions, a single water cannon 230 can be used, for example in areas with tall, condensed trees.

The water cannon 230 consists of a monitor 232 and a fire nozzle 234 that is attached to the monitor 232, FIG. 6. In this example, the fire nozzle 234 is at 90° and facing downward. When the fire nozzle 234 of the water cannon 230 is parallel and facing outward: it is at a 0° position: the monitor 232 can pivot from 0° to 175° on one rotation and pivot from 0° to 175° in the opposite rotation, FIG. 6. Therefore, the monitors 232 in water cannon 230 can revolve 350°. The monitors 232 are revolved in the direction of the target area of the fire.

Whatever position the monitor 232 pivot or rotates to, the fire nozzle 234 is always perpendicular to its monitor 232. When the fire nozzle 234 of the water cannon 230 is parallel and facing outward, the fire nozzle 234 is kept perpendicular to the body of the monitor 232: the fire nozzle 234 can rotate from 0° to 135°, while staying perpendicular with the body of the monitor 232, FIG. 8.

The water cannon 230 maneuvering in a 3-dimensional field, x, y, & z axis, consists of: the monitor can pivot to any angle on the x, y axis, FIG. 6, the fire nozzle 234 is always perpendicular to its monitor 232. The fire nozzle 234 axis is coincidental with the pivot angle of the monitor, FIG. 8. So, if the monitor 232 is horizontal in the x, y axis, the fire nozzle 234 will be on the x, z axis; if the monitor 232 is vertical; the fire nozzle 234 will be on the y, z axis, as illustrated in this example. Any angle the monitor 232 pivots to on the x, y axis; the fire nozzle 234 axis is coincidental with the pivot angle & the z axis.

When the monitors 232 pivots to the direction of the fire: the fire nozzles 234 can be aimed directly at the target area of the fire: or the fire nozzles 234 can rotate from any angle from 0° to 135°, making a sweeping motion on the flames. The fire nozzle 234 can be set at 568 L/min. at 537 kg/m$^2$ (kilograms per (square meter)) in this example. The fire nozzle has a maximum capacity of 2,650 L/min. at 2,441 kg/m$^2$.

The combination of the maneuvering and hovering of the transport unit 100, along with combining the maneuvering and pivotally of the straight boom lift 200, added with the combining the maneuvering and revolving of the water cannons 230 mounted on the main boom 218 provide a more reliable aerial technique for flexibility and maneuvering within close proximity to a fire.

The operations are very detailed in explanation, however, the aerial fire suppression system maneuvering from a closed position to an operating position set-up can be done in a quick and timely manner.

In FIG. 1, the transport unit 100 is hovered near an imaginary burning fire as an illustration. The Straight boom lift maneuvers the main boom 218, with its mounted water cannons 230, in close proximity of the fire. The water is released from the water tank 104 and water runs through the piping and hoses to the solenoid valves 306. The solenoid valves 306 are opened and water flows to the water pumps 304. The water pumps 304 pumps water to the water cannons 230. Each water cannon 230 blast water with a constant flow on the fire at 568 L/min, at 537 kg/m$^2$ from the 9,464 liters of water in water tank 104 in this illustration. The water cannons 230 can point directly at one spot of the target area of the fire: or make a sweeping, back and forth motion: until the fire is contained: or the transport unit 100 can maneuver to the next position of the fire. Afterwards, the transport unit 100 can return to the closed operating position and thereafter return to the reservoir location for refilling if required and proceed with the procedure again.

CONCLUSION, RAMIFICATIONS, AND SCOPE

As described hereinbefore, the embodiments provide a system for maneuvering within close proximity of a fire and extinguishing the fire. The combination of the maneuvering and hovering of the transport unit; along with the combined rotating, pivoting, and extending of the straight boom lift; including the pivotal main boom; added with the combined rotations of the water cannons provide a more reliable aerial technique for flexibility and maneuvering within close proximity of a fire. Accordingly, the system is a reliable resource and technique for the elimination of these fires. The system is applicable to all aspects of where these occurrences take place such as wildfires, forest fires, fires in general, or natural disasters.

While the above descriptions contain many specificities, these should not be construed as limitations on the scope, but rather as an exemplification of several embodiments thereof. The embodiment is capable of considerable modification, alteration, and equivalents. Accordingly, the scope should be determined not by the embodiments illustrated, but by the appended claims and their legal equivalents.

Although the embodiment has been shown and described with respect to a certain embodiment or embodiments, certain equivalent alterations and modifications will occur to others skilled in the art upon the reading and understanding of this specification and the annexed drawings. In particular regard to the various functions performed by the above describe components (assemblies, devices, etc.) the terms used to describe such components are intended to correspond, unless otherwise indicated, to any component which performs the specified function of the described component (i.e., that is functionally equivalent), even though not structurally equivalent to the disclosed structure which performs the function in the herein illustrated example embodiments. In addition, while a particular feature of the embodiment may have been disclosed with respect to only one of several embodiments, such feature may be combined with one or more features of the other embodiments as may be desired and advantageous for any given or particular application.

I claim:

1. An aerial fire suppression apparatus supported by a transport unit comprising:
   the transport unit being an aircraft having a cargo area with a hole cutout on the center of a floor inside the cargo area and modified for a firefighting unit;
   a plurality of water cannons each comprising a monitor wherein each of said monitors can pivot from 0° to 175° on one rotation and pivot from 0° to 175° in an opposite rotation;
   a fire nozzle mounted on each of said monitors whereby said fire nozzle stays perpendicular to said monitor and the fire nozzle has a range of motions from pinpointed directly at a target area to a pivotal sweeping motion;
   a straight boom lift comprising a frame and controls centered on the floor, inside the cargo area over the cutout hole;
   a shaft that supports a turntable of the straight boom lift is positioned from a bottom outside area of the transport unit;
   the turntable facing downward from the bottom outside area of the transport unit;
   the shaft is inserted through the hole cutout in the cargo area into a console of the straight boom lift that is inside the cargo area;
   the shaft positioned on said frame, whereby the shaft can rotate 360° in a clockwise or counterclockwise direction;
   a tower boom attached to the turntable whereby said tower boom can rotate downward to any predetermined angle;
   a plurality of extension booms are attached to said tower boom whereby said plurality of extension booms are made to fit inside one another and can individually extend to a predetermined length;
   the plurality of extension booms include an inner most extension boom;
   a main boom positioned on the inner most extension boom wherein an upright mounted to the main boom can pivot about a pivot point from a predetermined angle in one direction to a predetermined angle in an opposite direction whereby the pivot point is on a horizontal plane to said main boom;
   a plurality of intake bases each mounted on one end of the main boom;
   the plurality of water cannons each mounted to one of said intake bases;
   whereby the main boom is an anchor for each of the water cannons; and
   whereby the straight boom lift is applied in a reverse operation.

2. The aerial fire suppression apparatus of claim 1, wherein the maneuverability of each water canon of the plurality of water canons is in a 3 dimensional, x, y, and z axis comprising of: any angle the monitor pivots to on the x, y axis; and
   the axis of the fire nozzle is coincidental with the angle the monitor pivots to and the z axis.

3. The aerial fire suppression apparatus of claim 1, wherein a water tank is clamped to said transport unit.

4. The aerial fire suppression apparatus of claim 3, comprising a snorkel mounted to said water tank for pumping water from a reservoir to said water tank while the transport unit hovers near the target area.

5. The aerial fire suppression apparatus of claim 4, wherein:
   piping and pipe fittings are run from said water tank to and around one side of the cargo area of the transport unit; and
   further comprising a hose connecting from said pipe fittings from the cargo area to a union bracket mounted on the tower boom.

6. The aerial fire suppression apparatus of claim 3, wherein piping with fittings and hoses direct water to flow from said water tank to said water cannons.

7. The aerial fire suppression apparatus of claim 6, wherein each of the water cannons disperses water.

8. The aerial fire suppression apparatus of claim 1, wherein the frame and the controls of the straight boom lift are mounted inside the cargo area of the transport unit.

9. The aerial fire suppression apparatus of claim 1, wherein said tower boom and each said extension boom are mounted with union brackets.

10. The aerial fire suppression apparatus of claim 9, wherein a plurality of hoses are wrapped with a plurality of hose liners such that each end on said hoses connect to each end on said union brackets.

11. The aerial fire suppression apparatus of claim 10, wherein a plurality of solenoid valves are mounted on the main boom and aligned with said intake bases.

12. The aerial fire suppression apparatus of claim 11, wherein a plurality of water pumps are mounted to said main boom and aligned with said solenoid valves.

13. The aerial fire suppression apparatus of claim 12, wherein piping and pipe fittings connect from said water cannons to said water pumps and further connect from said water pumps to said solenoid valves.

14. The aerial fire suppression apparatus of claim 13, wherein said piping and pipe fittings connect from said solenoid valves to the union bracket on the inner most extension boom.

\* \* \* \* \*